(12) United States Patent
Klein

(10) Patent No.: US 6,569,921 B1
(45) Date of Patent: May 27, 2003

(54) PIGMENT PASTES, PRODUCTION THEREOF AND COATING AGENTS THAT CAN BE CATHODICALLY DEPOSITED, CONTAINING SAID PIGMENT PASTES

(75) Inventor: Klausjörg Klein, Wuppertal (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/031,307

(22) PCT Filed: Jul. 11, 2000

(86) PCT No.: PCT/EP00/06551

§ 371 (c)(1),
(2), (4) Date: Jan. 15, 2002

(87) PCT Pub. No.: WO01/05900

PCT Pub. Date: Jan. 25, 2001

(30) Foreign Application Priority Data

Jul. 15, 1999 (DE) .......................................... 199 33 094

(51) Int. Cl.$^7$ ............................. C08K 3/20; C08L 63/02
(52) U.S. Cl. ..................... 523/404; 523/414; 525/107; 525/524; 528/119
(58) Field of Search ................................ 513/404, 414; 525/107, 524; 528/119

(56) References Cited

U.S. PATENT DOCUMENTS 4,007,154 A * 2/1977 Schimmel .................. 523/404
4,968,730 A   11/1990 Hönig et al.

FOREIGN PATENT DOCUMENTS

| EP | 0107088 | 5/1984 |
| EP | 0107089 | 5/1984 |
| EP | 0107098 | 5/1984 |
| EP | 0173241 | 3/1986 |
| EP | 0183025 | 6/1986 |
| EP | 0199473 A | 10/1986 |
| EP | 0350618 | 1/1990 |
| EP | 0469497 | 2/1992 |
| EP | 0352677 A | 1/1999 |
| JP | 1140353 A | 5/1999 |
| WO | WO 88/00224 | 1/1988 |

* cited by examiner

Primary Examiner—Robert Dawson
Assistant Examiner—D. Aylward
(74) Attorney, Agent, or Firm—Bart E. Lerman

(57) ABSTRACT

Pigment pastes suitable for the production of cathodically depositable electrodeposition lacquers (CEC) obtainable by dispersion of pigments and/or fillers in an aqueous paste resin containing tertiary-bonded amino nitrogen, whereby epoxy compounds and, if not already present, acid are added to the aqueous paste resin in the presence of pigments and/or fillers, process for their production and CEC coating compounds containing the same.

10 Claims, No Drawings

PIGMENT PASTES, PRODUCTION THEREOF AND COATING AGENTS THAT CAN BE CATHODICALLY DEPOSITED, CONTAINING SAID PIGMENT PASTES

BACKGROUND OF THE INVENTION

The invention concerns a pigment paste that is suitable for the production of cathodically depositable electrodeposition coating compounds (CEC), a process for their production, their use in the production of CEC coating compounds and CEC coating compounds thus produced.

The new preparation or solids compensation of CEC baths by the user via one-component concentrates is known. These concentrates are produced by grinding pigments and fillers in the organic solution of a CEC binder, neutralising with acid and generally diluting with water. As a rule the concentrates are delivered to the user with a solids content of over 50 wt. % and a solvent content of between 20 and 40 wt. %. The concentrates have a long shelf life and high viscosities. The user has to mix them with water to prepare a new CEC bath or with the solids-depleted content of a CEC bath in the case of solids compensation.

Two-component CEC materials have been developed as a more technologically favourable version of the one-component CEC concentrates, from which the user can prepare new baths by diluting with water or which can be used for solids compensation by mixing with the solids-depleted content of a CEC bath. Two-component CEC materials comprise a) a binder component in the form of a solvent-free or low-solvent aqueous- dispersion of the CEC binder with the optional presence of a crosslinking agent (CEC dispersion) and b) a separate pigment paste, which is generally produced by grinding the pigments and fillers in an aqueous cationic paste resin. Both components are acid-neutralised aqueous systems that are compatible with the content of the CEC bath. Dilution with water or with the solids-depleted content of the CEC bath can be performed for example by adding the two components separately but in parallel to the water or to the solids-depleted CEC bath.

Pigment pastes for use in the production of CEC coating compounds, which can be produced by grinding pigments in paste resins displaying quaternary ammonium groups, are known from e.g. EP-A-0 107 088, EP-A-0 107 089, EP-A-0 107 098, EP-A-0 173 214, EP-A-0 350 618, EP-A-0 352 677. CEC coating compounds produced with such pigment pastes are characterised by lower contents of titrable acids in comparison to CEC coating compounds produced with other pigment pastes.

The object of the invention is the provision of pigment pastes for use in the production of cathodically depositable electrodeposition lacquers by the two-component method, which can be easily produced and are resistant to sedimentation. CEC coatings that are unaffected by surface defects and have good edge coverage, even where the CEC coating compounds have a low pigment content, should be depositable onto electrically conductive substrates from the CEC coating compounds produced using the pigment pastes.

It has been found that this object can be achieved if epoxy compounds and optionally acid are added to an aqueous paste resin containing tertiary-bonded amino nitrogen in the presence of pigments and/or fillers.

SUMMARY OF THE INVENTION

The invention therefore provides pigment pastes obtainable by dispersion of pigments and/or fillers in an aqueous paste resin containing tertiary-bonded amino nitrogen, characterised in that epoxy compounds and, if not already present, acid are added to the aqueous paste resin in the presence of pigments and/or fillers.

The invention also concerns a process for the production of aqueous pigment pastes in which pigments and/or fillers are dispersed in an aqueous paste resin containing tertiary-bonded amino nitrogen, characterised in that epoxy compounds and, if not already present, acid are added to the aqueous paste resin in the presence of pigments and/or fillers.

DETAILED DESCRIPTION OF THE INVENTION

The term "paste resin" refers to a resin that can be used for the dispersion of pigments and/or fillers; it comprises CEC binders which display groups having tertiary-bonded amino nitrogen and can be part of CEC dispersions. The content of tertiary-bonded amino nitrogen is for example 35 to 300 milliequivalents per 100 g solid paste resin. In addition to the necessary groups having tertiary-bonded amino nitrogen, the paste resins can also contain groups having primary and/or secondary-bonded amino nitrogen and/or quaternary ammonium groups. The paste resins used in the production of the pigment pastes according to the invention are preferably not CEC binders contained in CEC dispersions but different dispersing resins. Examples of paste resins with groups having tertiary-bonded amino nitrogen are amino (meth)acrylate resins, amino polyurethane resins or preferably amino epoxy resins, in which a part of or all epoxy groups can have been converted to five-member cyclic carbonate groups by reaction with carbon dioxide, containing appropriate groups. The groups having tertiary-bonded amino nitrogen are tertiary amino groups, which can be present in the polymer backbone and/or as lateral and/or as terminal groups in the paste resin, e.g. in the form of di(cyclo)alkyl amino groups with e.g. $C_1$ to $C_{18}$ alkyl groups, which can be the same or different. The term "tertiary amino groups" expressly includes nitrogen heterocyclic groups containing tertiary-bonded amino nitrogen as a ring member.

Amino(meth) acrylate resins having tertiary amino groups can be produced for example by radical copolymerisation of olefinically unsaturated monomers having tertiary amino groups (only dimethyl aminoethyl (meth)acrylate is mentioned here by way of example) with olefinically unsaturated comonomers. An alternative production method for amino (meth)acrylate resins consists in the addition of secondary monoamines to epoxy-functional (meth)acrylic copolymers.

Amino polyurethane resins having tertiary amino groups can be produced by the addition reaction of polyisocyanates, tertiary alcohol amines and polyols, for example.

The preferred amino epoxy paste resins with tertiary amino groups can for example be produced by reaction of epoxy resins with primary and/or secondary monoamines and/or polyamines in organic solution or in the melt. If the reaction is performed in organic solution, water-miscible solvents, for example alcohols such as isopropanol, isobutanol, n-butanol; glycol ethers such as methoxy propanol, butoxy ethanol; glycol ether esters such as butyl glycol acetate or water-immiscible solvents such as xylene can be used as solvents or solvent blends. Epoxy resins are in particular epoxy group-containing aromatic polyglycidyl ethers. In the context of the present invention, the term "epoxy resins" is also intended to include such epoxy resin derivatives in which a part of or all epoxy groups, for example epoxy groups of epoxy group-containing aromatic polyglycidyl ethers, have been converted to 5-member cyclic carbonate groups by reaction with carbon dioxide. Aromatic polyglycidyl ethers derive primarily from the reaction of polyphenols, preferably diphenols and in particular polynuclear diphenols, with epichlorohydrin. The Inherently aromatic polyglycidyl ethers can also contain aliphatic components. They are preferably based exclusively on diphenols, however. Epoxy resins or mixtures thereof displaying an epoxy and/or cyclocarbonate equivalent weight of between 170 and 1000 are preferably used for the synthesis of amino epoxy paste resins. Particularly preferred aromatic epoxy resins are the conventional commercial epoxy resins, which are derived primarily from the reaction of diphenylol propane (bisphenol A) with epichlorohydrin. The monoamines and/or polyamines can in addition to the primary and/or secondary amino groups also contain other functional groups, in particular hydroxyl groups and/or tertiary amino groups. Examples of monoamines and/or polyamines having primary and/or secondary amino groups and optionally other functional groups are methylamine, ethylamine, propylamine, butylamine, octylamine, 2-ethylhexylamine, dimethylamine, diethylamine, dipropylamine, dibutylamine, methyl butylamine, morpholine, diethyl aminoethylamine, dimethyl aminopropylamine, lauryl propylene diamine, diethylene triamine, N,N'-bis(isohexyl)-1,6-diaminohexane, ethanolamine, propanolamine, ethylene glycol(2-aminoethyl) ether, N-methylaminoethanol or diethanolamine, 1:2 adducts of diprimary amine such as 1,6-diaminohexane or 2-methyl pentamethylene diamine and monoepoxy such as glycidyl ethers, glycidyl esters or monoepoxy alkanes.

The amino epoxy paste resins are produced in such a way that no free amine remains, preferably with complete consumption of the epoxy and/or cyclic carbonate groups in the aromatic epoxy resin (derivative). The primary or secondary amino groups in the monoamine or polyamine respectively can be partially or completely reacted to tertiary amino groups in this process. Any secondary amino groups optionally remaining in the amino epoxy paste resin can be converted by means of further chemical reactions into groups with tertiary-bonded amino nitrogen, for example by Michael addition to activated olefinic double bonds, by alkylolation with monoepoxies or with aldehydes. Such reactions can optionally be followed by further reactions, for example cyclisation reactions, in which the tertiary-bonded amino nitrogen is converted to a ring member of a nitrogen-containing heterocycle for example. The oxazolidine ring can be cited as an example of such a such a heterocyclic ring system, such as can be obtained for example by methylolation of a secondary amino group located in the beta position to a hydroxyl group (for example a structural element produced by the addition of a primary amino group to an epoxy group) with formaldehyde and subsequent cyclisation to the oxazolidine ring with elimination of water.

The amino epoxy paste resins with tertiary-bonded amino nitrogen display for example a content of amino groups of 35 to 360 milliequivalents per 100 g of solid resin. The content of tertiary amino groups, which can be present in the amino epoxy paste resin as substituents and/or as a component of the polymer backbone, is for example 35 to 300 milliequivalents per 100 g of solid resin. Besides the tertiary amino groups the amino epoxy paste resins particularly preferably contain no other amino groups such as e.g. primary and/or secondary groups. The amino epoxy paste resins can contain quaternary ammonium groups. The amino epoxy paste resins generally contain hydroxyl groups, corresponding to a hydroxyl value of between 40 and 300 mg KOH/g solid resin, for example. These hydroxyl groups can be unreacted or partially or completely reacted, for example urethanised. The amino epoxy paste resins can display chemical modifications. For example the amino epoxy paste resins can contain urethane groups, polyether groups or polyamide groups. The number average molecular weights (Mn) of the amino epoxy paste resins are for example between 1000 and 10000. Examples of amino epoxy paste resins with tertiary-bonded amino nitrogen for use in CEC baths, which can be used according to the invention but which are not to be regarded as a restriction, are those described in EP-A-0 183 025 and EP-A-0 469 497.

The tertiary-bonded amino nitrogen in the paste resins, which are in the form of a melt or an organic solution, is preferably neutralised with acid, preferably with carboxylic acids or sulfonic acids, corresponding for example to a degree of neutralisation of for example 10 to 90%. This can be performed at elevated temperatures of for example 30 to 140, preferably 30 to 90° C. Examples of suitable carboxylic acids are formic acid, acetic acid and lactic acid. Examples of suitable sulfonic acids are amidosulfonic acid or organic sulfonic acids such as N-alkyl amidosulfonic acids; alkane sulfonic acids such as methane sulfonic acid. The preferably neutralised paste resins are converted to the aqueous phase by the addition of water. Any organic solvent optionally present can be removed down to the desired content, for example by vacuum distillation. The aqueous paste resins display a solids content of for example 25 to 50 wt. %.

According to the invention the acid can also be added to the aqueous paste resin before or after the addition of pigments and/or fillers. The acid is preferably added before the addition of the epoxy compounds. It is substantial to the invention that epoxy compounds are added to the aqueous paste resin in the presence of pigments and/or fillers, whereby the tertiary amino nitrogen is or becomes protonated by neutralisation with acid. The epoxy compounds are preferably added in a quantity corresponding to 15 to 80, preferably 20 to 60 milliequivalents of epoxy per 100 g of the mixture of paste resin and epoxy compounds. The ratio of epoxy equivalents in the added epoxy compounds to acid equivalents is preferably less than or equal to 1:1. The same is true of the ratio of epoxy equivalents in the added epoxy compounds to tertiary amine equivalents. The epoxy compounds can be added before, during or after dispersion of the pigments and/or fillers. They are preferably added after dispersion.

The addition of the epoxy compounds is followed by consumption of the epoxy groups. The epoxy compounds are added in the presence of the pigments and/or fillers. Pigments and/or fillers are preferably first dispersed in the paste resin and consumption of the epoxy groups in the added epoxy compounds takes place or is completed only afterwards. It is particularly preferable that the epoxy compounds are added only once dispersion has been completed. For example the epoxy compounds can be added on completion of dispersion and mixed together well, whereby the subsequently occurring consumption of the epoxy groups in the added epoxy compounds can be supported by suitable measures, such as e.g. heating, for example to 30 to 90° C., and/or stirring. It is preferable, however, to dispense with supportive measures and to allow consumption of the epoxy groups to take place during subsequent storage. Consumption of the epoxy groups during storage is generally completed within the first 24 hours.

It is assumed that the consumption of the epoxy groups in the epoxy compounds added to the aqueous paste resin in the presence of pigments and/or fillers is attributable to a quaternisation of protonated tertiary amino groups in the paste resin.

The epoxy compounds can be monoepoxy and/or polyepoxy compounds, which can be used individually or in a mixture. Polyepoxy compounds are preferred. Examples of monoepoxies are glycidyl ethers, glycidyl esters or monoepoxy alkanes. The preferred polyepoxies have on average more than one, preferably between 1.5 and 3 epoxy groups per molecule. They are particularly preferably diepoxies. The polyepoxies can be Low-molecular, defined compounds or oligomeric or polymeric compounds. The epoxy equivalent weights of the polyepoxies are preferably between 87 and 500. Examples of polyepoxies are polyglycidyl ethers of polyfunctional alcohols or polyfunctional phenols, in particular diols and/or diphenols, such as e.g. hydrogenated bisphenol A glycidyl ether, hexanediol diglycidyl ether, glycerol triglycidyl ether, diglycidyl hexahydrophthalate, diglycidyl esters of dimeric acids, epoxidised derivatives of (methyl)cyclohexene, such as e.g. 3,4-epoxycyclohexylmethyl-(3,4-epoxycyclohexane) carboxylate, epoxy-functional poly(meth)acrylate resins, polyalkylene glycol diglycidyl ether or epoxidised polybutadiene. Preferred polyepoxies are aromatic epoxy resins such as are primarily derived from the reaction of polyphenols, preferably diphenols and in particular polynuclear diphenols, with epichlorohydrin. Particularly preferred aromatic epoxy resins are the conventional commercial epoxy resins, which are primarily derived from the reaction of diphenylol propane (bisphenol A) with epichlorohydrin.

The pigments and/or fillers are dispersed in the aqueous paste resin containing tertiary amino nitrogen, which is protonated with acid before addition of the epoxy compounds, after, during and/or before addition of the epoxy compounds. They are preferably dispersed before addition of the epoxy compounds. Dispersion or grinding of the pigments and/or fillers can be performed using units and procedures conventionally used in lacquer production, for example using high-speed mixers and/or bead mills.

Examples of pigments are the conventional inorganic and/or organic coloured pigments such as e.g. titanium dioxide, iron oxide pigments, carbon black, phthalocyanine pigments, quinacridone pigments, as well as anti-corrosive pigments, such as zinc phosphate or lead silicate. The term "pigments" expressly includes powdered catalysts, such as for example dibutyl tin oxide, lead oxide, bismuth oxide. In many cases it is preferable to add powdered catalysts such as e.g. dibutyl tin oxide, lead oxide, bismuth oxide, in the form of an acid pulp during dispersion. An example of an acid pulp of dibutyl tin oxide is provided by EP-0 436 135 A1. Examples of fillers are kaolin, talc or silicon dioxide.

Catalyst powders can be dispersed separately to form catalyst pastes or together with pigments and/or fillers to form pigment pastes containing catalyst. In the case of the acid pulps of powdered catalysts mentioned above, the addition of acid that is required before addition of the epoxy compounds can be effected partially or even completely by means of such an acid pulp.

Production of the pigment pastes according to the invention is simple, particularly if dispersion of the pigments and/or fillers is performed in aqueous paste resins known per se and displaying tertiary-bonded amino nitrogen and epoxy compounds are added on completion of dispersion and mixed together well and consumption of the epoxy groups in the added epoxy compounds takes place during subsequent storage of the pigment preparation thus produced, practically in the sense of maturing to the pigment paste according to the invention.

The pigment pastes according to the invention display ratios by weight of pigment and/or filler/paste resin plus epoxy compound solids of for example 2:1 to 10:1. The solids content of the pigment pastes according to the invention is for example 40 to 65 wt. %. The pigment pastes according to the invention are very resistant to sedimentation, even over extended storage periods, for example more than 6 months. It is advantageous that only a little titrable acid finds its way into CEC coating compounds produced with the pigment pastes according to the invention.

The invention also concerns the use of the pigment pastes according to the invention for the production of CEC coating compounds and the CEC coating compounds.

CEC coating compounds according to the invention can be produced by mixing the pigment pastes according to the invention with CEC binder dispersions in the solids weight ratio of for example 1:1 to 1:10. The user can for example prepare new CEC baths by diluting with water or can perform a solids compensation by mixing with the content of solids-depleted CEC baths.

CEC dispersions containing CEC binders and optionally crosslinking agents, which can be used for the production of CEC baths, are known. The CEC binders are binders carrying cationic groups or basic groups capable of being converted to cationic groups, e.g. amino, ammonium, e.g. quaternary ammonium, phosphonium and/or sulfonium groups. CEC binders with basic groups are preferred, those with nitrogen-containing basic groups, such as amino groups, particularly preferred. These groups can be in quaternised form or they are converted to cationic groups with a conventional neutralising agent, e.g. an organic monocarboxylic acid, such as e.g. lactic acid, formic acid, acetic acid, or a sulfonic acid such as e.g. amidosulfonic acid, N-alkylamidosulfonic acid, methane sulfonic acid, such as is familiar to the person skilled in the art. Such basic resins are for example resins containing primary, secondary and/or tertiary amino groups. The amine values of such resins are e.g. 20 to 250 mg KOH/g. The weight average molecular weight (Mw) of the resins is preferably 300 to 10000.

Examples of CEC binders are amino(meth)acrylate resins, aminopolyurethane resins, amino group-containing polybutadiene resins, aminoepoxy resins, and epoxy resin-carbon dioxide-amine conversion products. The CEC binders can be self-crosslinking or they are used in a mixture with known crosslinking agents. Examples of such crosslinking agents are amino plastic resins, crosslinking agents with terminal double bonds, polyepoxy compounds, crosslinking agents containing groups capable of interesterification and/or interamidation, and in particular blocked polysocyanates.

CEC dispersions can be produced by synthesis of binders containing cationic groups or groups capable of being converted to cationic groups (CEC binders) in the presence or absence of organic solvents and conversion to an aqueous dispersion by dilution of the binder, which has previously been neutralised with acid, with water. The CEC binder(s) can be mixed with one or more suitable crosslinking agents and this mixture converted to the aqueous dispersion. Organic solvent, if present, can be removed down to the desired content before or after conversion to the aqueous dispersion, by vacuum distillation for example. Subsequent removal of solvents can for example be avoided if the CEC binders, optionally mixed with crosslinking agents, are neutralised with acid in a low-solvent or solvent-free state, e.g. as a solvent-free melt, at temperatures of up to 140° C. and then converted to the CEC dispersion with water. The removal of organic solvents can also be avoided if the CEC binders are prepared as a solution in a radically polymerisable, olefinically unsaturated monomer or if the binder synthesis is performed in a radically polymerisable monomer (e.g. styrene) as solvent, followed by conversion to an aqueous dispersion by neutralisation with acid and dilution with water and the radically polymerisable monomer then removed by polymerisation.

CEC dispersions have solids contents of for example 30 to 45 wt. % and a content of organic solvents of preferably below 5 wt. %, relative to the dispersion solids.

The CEC coating compounds produced using the pigment pastes according to the invention are preferably aqueous coating compounds with a solids content of 10 to 30 wt. %, for example 10 to 20 wt. %. This is composed of the resin solids, consisting of the CEC binders, the paste resin(s), the epoxy compounds whose epoxy groups have been consumed, and crosslinking agents that are optionally present, pigments and/or fillers and non-volatile additives conventionally used in lacquers. The ratio by weight of pigment to resin solids in the CEC coating compounds is for example 0.01:1 to 0.7:1, whereby fillers are included with pigments in the calculation.

The CEC coating compounds can contain conventional additives, such as are known in particular for CEC coating compounds. Examples of these are wetting agents, flow control agents, catalysts, corrosion inhibitors, antifoam agents, solvents.

CEC coating films deposited from the CEC coating compounds according to the invention are unaffected by surface defects, for example substances causing craters. CEC coatings with good edge coverage can be deposited onto electrically conductive substrates from the CEC coating compounds according to the invention.

The CEC coating compounds according to the invention can be applied by cathodic electrodeposition in the context of a single-layer or multi-layer lacquer system to various electrically conductive substrates or substrates rendered electrically conductive, in particular metallic substrates, and stoved. The CEC coating compounds are particularly suitable for the vehicle sector, for example for priming vehicle bodies or vehicle body parts.

The following examples illustrate the invention.

EXAMPLES

Example 1

Production of a Pigment Paste, Reference 15 g acetic acid (50%), 30 g of a commercial wetting agent (50%) and 350 g deionised water are added in a high-speed mixer to 223 g of the 55 wt. % organic solution of the paste resin containing tertiary amino groups according to EP-A-0 469 497 A1, example 1 (amino epoxy paste resin, obtained by elimination of water from a reaction product of 2-ethylhexylamine, aliphatic epoxy resin, bisphenol A epoxy resin and 3-dimethylamino-1-propylamine, methylolated with paraformaldehyde). 12.3 g carbon black and 430 g titanium dioxide are added. The mixture is adjusted with deionised water to a solids content of 53 wt. % displaying a suitable grinding viscosity and ground in a bead mill. A pigment paste with a viscosity of 20 seconds (DIN 53211/ 20° C.) is formed. Acid base titration of the pigment paste produces a content of 21.6 milliequivalents of acid per 100 g of solids.

Example 2

Production of a Pigment Paste, Reference

Example 1 is repeated, whereby 12 g of an aromatic epoxy resin (Epikote® 828 from Shell, epoxy equivalent weight 188) are incorporated and thoroughly homogenised using a high-speed mixer before addition of the pigments. 12.3 carbon black and 430 g titanium dioxide are added to the product after it has been stored for two days. After adjusting the solids content to 53 wt. % with deionised water a suitable grinding viscosity is not achieved. A suitable grinding viscosity is achieved by further dilution with deionised water to a solids content of 50 wt. %. After grinding on a bead mill a pigment paste with a viscosity (DIN 53211/20° C.) of 20 seconds is formed. Acid base titration of the pigment paste produces a content of 15.8 milliequivalents of acid per 100 g of solids.

Example 3

Production of a Pigment Paste, According to the Invention

Example 1 is repeated. 12 g of an aromatic epoxy resin (Epikote® 828 from Shell, epoxy equivalent weight 188) are added to the 53 wt. % pigment paste and thoroughly homogenised using a high-speed mixer. The solids content is adjusted to 53 wt. % with deionised water and the mixture is stored for two days. A pigment paste with a viscosity (DIN 53211/20° C.) of 80 seconds is formed. Acid base titration of the pigment paste produces a content of 16.2 milliequivalents of acid per 100 g of solids.

The pigment pastes from examples 1 to 3 were each introduced into 100 ml plain cylinders and stored sealed at 20° C. The samples were observed for the onset of sedimentation: pigment paste 1, onset of sedimentation after 28 days; pigment paste 2, onset of sedimentation after 42 days; pigment paste 3, no signs of sedimentation after 6 months.

Examples 4a–c

Production of CEC Baths and Coatings

CEC baths 4a, 4b (both reference) and 4c (according to the invention), each having a solids content of 20 wt. % and a ratio by weight of pigment to binder of 0.3:1, are produced by conventional means by mixing a CEC dispersion having a solids content of 35 wt. % and containing a CEC binder (amino epoxy resin) and crosslinking agent (blocked polyisocyanate) and tin catalyst with deionised water and adding the pigment pastes from examples 1, 2 and 3 respectively whilst stirring well. Perforated sheets of conventional phosphated car body steel were coated from the CEC baths by cataphoresis in a dry film thickness of 20 µm and stoved for 30 minutes at 180° C. The sheets coated in this way were subjected to a 480-hour salt spray test according to DIN 53167. The perforated sheets suffered attack by corrosion as follows: 4a, 80%; 4b, 40%; 4c, 45%

CEC baths 4a, 4b and 4c were each contaminated with 0.25%, relative to their solids content, of ASTM oil no. 1 (commercial product from Fuchs Mineralölwerke GmbH, Mannheim) as a crater-causing agent. Conventional phosphated car body steel sheets were coated from the CEC baths by cataphoresis in a dry film thickness of 20 µm and stoved for 30 minutes at 180° C. The number of craters per square decimetre of coated surface was determined in each case: 4a, 12 craters; 4b, 2 craters; 4c, 2 craters.

What is claimed is:

1. An aqueous pigment paste for cathodically depositable electrocoating compounds comprising
   (1) an aqueous paste resin comprising (a) a tertiary amino nitrogen resin having a tertiary amino nitrogen content of 35–300 milliequivalents per 100 g solids paste resin and the resin being selected from the group consisting of amino (meth)acrylate resins, amino polyurethane resins, and amino epoxy resins and (b) at least one epoxy compound in sufficient amount to provide 15–80 milliequivalents of epoxy per 100 grams of the paste resin and wherein the paste resin being at least partially neutralized with an acid selected from the group consisting of carboxylic acids and sulfonic acids; and
   (2) dispersed constituents selected from the group consisting of pigments, fillers and mixtures thereof.

2. The aqueous pigment paste of claim 1 in which the tertiary amino nitrogen resin consists of an amino (meth)acrylate resin.

3. The aqueous pigment paste of claim 1 in which the tertiary amino nitrogen resin consists of an amino polyurethane resin.

4. The aqueous pigment paste of claim 1 in which the tertiary amino nitrogen resin consists of an amino epoxy resin of an aromatic polyglycidyl ether.

5. The aqueous pigment paste of claim 1 in which the epoxy compound consists of a polyepoxy compound having an epoxy equivalent weight between 87 and 500.

6. A process for forming the aqueous pigment paste of claim 1 which comprises dispersing the constituents selected from the group consisting of pigments, fillers and mixtures thereof in the aqueous paste resin to form a dispersion and blending the epoxy compound with the resulting dispersion and subsequently at least partially neutralizing the paste resin with an acid selected from the group consisting of carboxylic acids and sulfonic acids.

7. An aqueous cathodically depositable electrodepositon coating compound containing a binder and the aqueous pigment paste of claim 1.

8. The aqueous cathodically depositable electrodeposition coating compound of claim 7 wherein the aqueous paste resin is different from the binder of the cathodically depositable electrodeposition coating compound.

9. A substrate coated with an electrodeposited film of the coating compound of claim 7.

10. A process for forming an aqueous cathodically depositable electrodeposition coating compound which comprises blending the aqueous pigment paste of claim 1 with an aqueous cathodically depositable binder composition.

* * * * *

UNITED STATES PATENT AND TRADEMARK OFFICE
CERTIFICATE OF CORRECTION

PATENT NO.    : 6,569,921 B1
DATED         : May 27, 2003
INVENTOR(S)   : Klausjorg Klein It is certified that error appears in the above-identified patent and that said Letters Patent is hereby corrected as shown below:

Column 3,
Line 50, the phrase "such a such a" should read -- such a --.

Column 6,
Line 55, the word "polysocyanates" should read -- polyisocyanates --.

Column 9,
Line 7, cancel beginning with "1. An aqueous pigment" to and including "and mixtures thereof."
Line 19, and insert the following claim:

```
1.  An aqueous pigment paste for cathodically depositable electrocoating
compounds comprising
   (1) an aqueous paste resin comprising (a) a tertiary amino nitrogen resin
   having a tertiary amino nitrogen content of 35-300 milliequivalents per 100 g
   solids paste resin and the resin being selected from the group consisting of
   amino (meth)acrylate resins, amino polyurethane resins, and amino epoxy resins
   and (b) at least one epoxy compound in sufficient amount to provide 15-80
   milliequivalents of epoxy per 100 grams of the mixture of the paste resin and
   the at least one epoxy compound and wherein the paste resin being at least
   partially neutralized with an acid selected from the group consisting of
   carboxylic acids and sulfonic acids; and
   (2) dispersed constituents selected from the group consisting of pigments,
   fillers and mixtures thereof.
```

Signed and Sealed this

Seventh Day of October, 2003

JAMES E. ROGAN
*Director of the United States Patent and Trademark Office*